Figure 1:
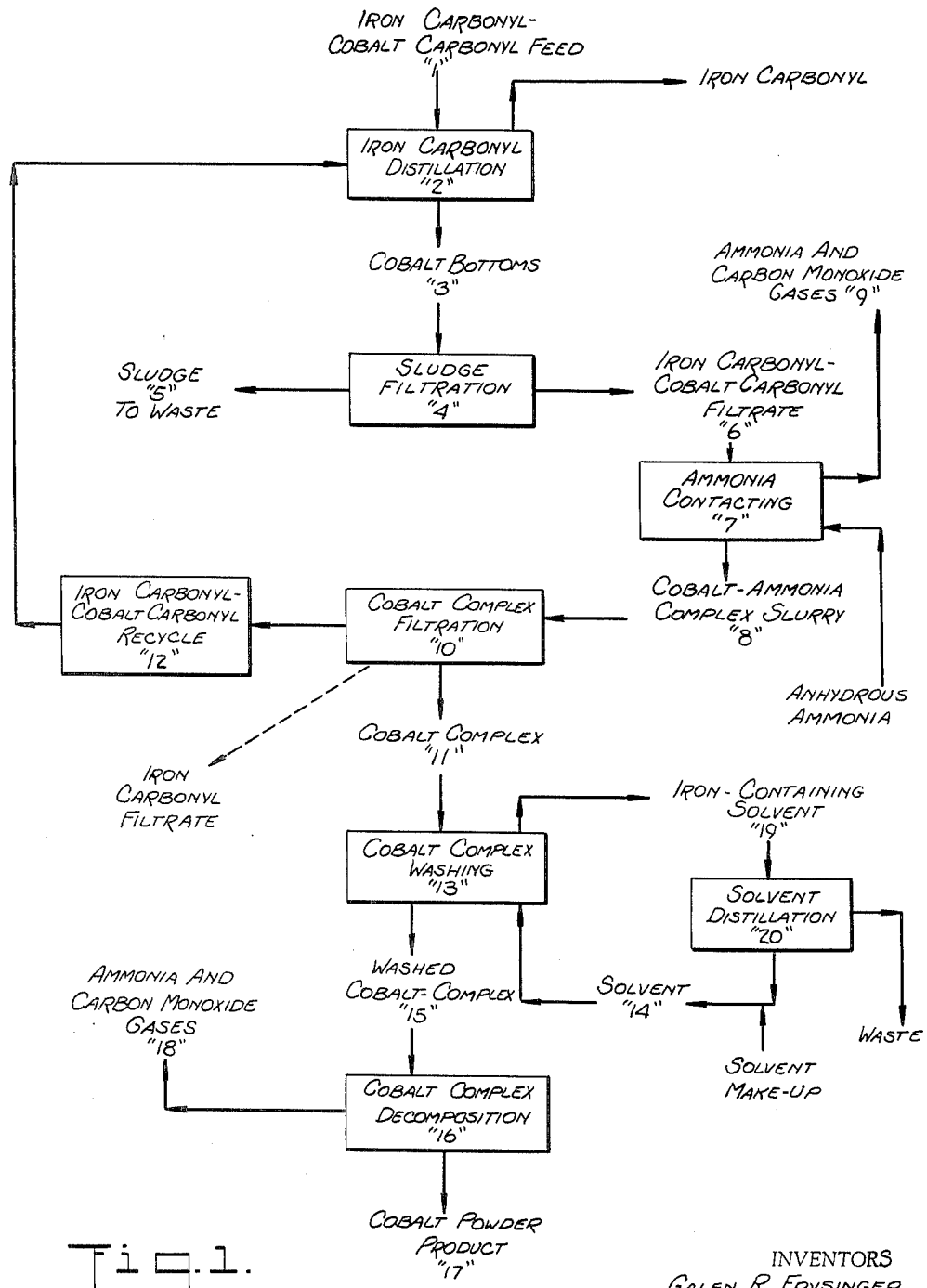

United States Patent Office 3,252,791
Patented May 24, 1966

3,252,791
SEPARATION OF METAL CARBONYLS BY FORMING A COBALT COMPLEX SALT THAT IS INSOLUBLE IN LIQUID NICKEL AND IRON CARBONYL
Galen Royer Frysinger, Arlington, and Heinz Paul Beutner, Cambridge, Mass., assignors, by mesne assignments, to The International Nickel Company, Inc., New York, N.Y., a corporation of Delaware
Filed Mar. 20, 1963, Ser. No. 266,611
22 Claims. (Cl. 75—119)

The present invention relates to the treatment of mixtures of metal carbonyls and, more particularly, to the separation of cobalt carbonyl from iron and/or nickel carbonyl and the recovery of cobalt metal powder from the separated cobalt carbonyl.

It is well known that in the processing of ores, concentrates, mattes and metallurgical residues containing nickel, iron and cobalt by carbonyl techniques mixtures of the carbonyls of these metals are obtained as products of the reactions taking place. Thus, in the process described in U.S. Patent No. 2,944,883, nickel-containing sulfide ores or crude metallurgical products derived therefrom are treated for recovery of nickel, cobalt and iron therefrom as carbonyls. Pure nickel carbonyl is usually readily separated from this mixture of carbonyls by fractional distillation techniques but considerable difficulty is encountered in obtaining a clean separation of the mixture of iron and cobalt carbonyls remaining. Some iron carbonyl may be removed from the mixture by distillation but it is impossible to obtain a complete separation of the cobalt carbonyl from the iron carbonyl in this manner. Removal of iron may be accomplished by a long and costly heating procedure, carried out at below the boiling point of iron carbonyl and utilizing a carrier gas such as carbon monoxide to remove the iron carbonyl from the cobalt carbonyl. By this complex procedure formation of solid iron carbonyl compounds or solid decomposition products of iron carbonyl and decomposition of other carbonyls such as cobalt carbonyl may be prevented. Development of a commercial process for cleanly and economically separating cobalt and iron carbonyls is highly desirable.

Although many attempts were made to overcome the foregoing difficulties and other difficulties, none, as far as we are aware, was entirely successful when carried into practice commercially on an industrial scale.

It has now been discovered that metal carbonyl mixtures containing cobalt carbonyl and iron and/or nickel carbonyls may be successfully and economically treated for removal of cobalt carbonyl therefrom in the form of a complex cobalt salt which is insoluble in the carbonyls remaining and which is substantially completely free from any iron and/or nickel contamination.

It is an object of the present invention to provide a process for cleanly separating cobalt carbonyl from iron carbonyl and/or nickel carbonyl.

Another object of the invention is to provide a novel method for treating a mixture of cobalt carbonyl and iron carbonyl contaminated with sulfur for the removal of cobalt therefrom in a product substantially free from iron and sulfur contamination.

The invention also contemplates providing an economically feasible, continuous process for separating cobalt and iron carbonyls into an iron product substantially free from cobalt and a cobalt product substantially free from iron.

It is a further object of the invention to provide a novel process for recovering substantially pure cobalt metal powder from a mixture of cobalt, iron and nickel carbonyls.

The invention further contemplates providing a novel process for treating a mixture of carbonyls of iron and cobalt for substantially complete removal of cobalt therefrom as a pure cobalt product which can be readily treated for recovery of pure cobalt metal.

It is another object of the invention to provide a novel process for removing cobalt carbonyl from a mixture of metal carbonyls.

Still another object of the invention is to provide an economical method for separating cobalt carobnyl from a mixture of cobalt, iron and nickel carbonyls in a product which can be readily treated for recovery of the cobalt therefrom.

It is also an object of the invention to treat a mixture of carbonyls of cobalt, iron and nickel containing sulfur impurities to remove the sulfur therefrom and obtain substantially pure iron carbonyl and nickel carbonyl products and a cobalt product substantially free from iron, nickel and sulfur contamination.

Figure 2:
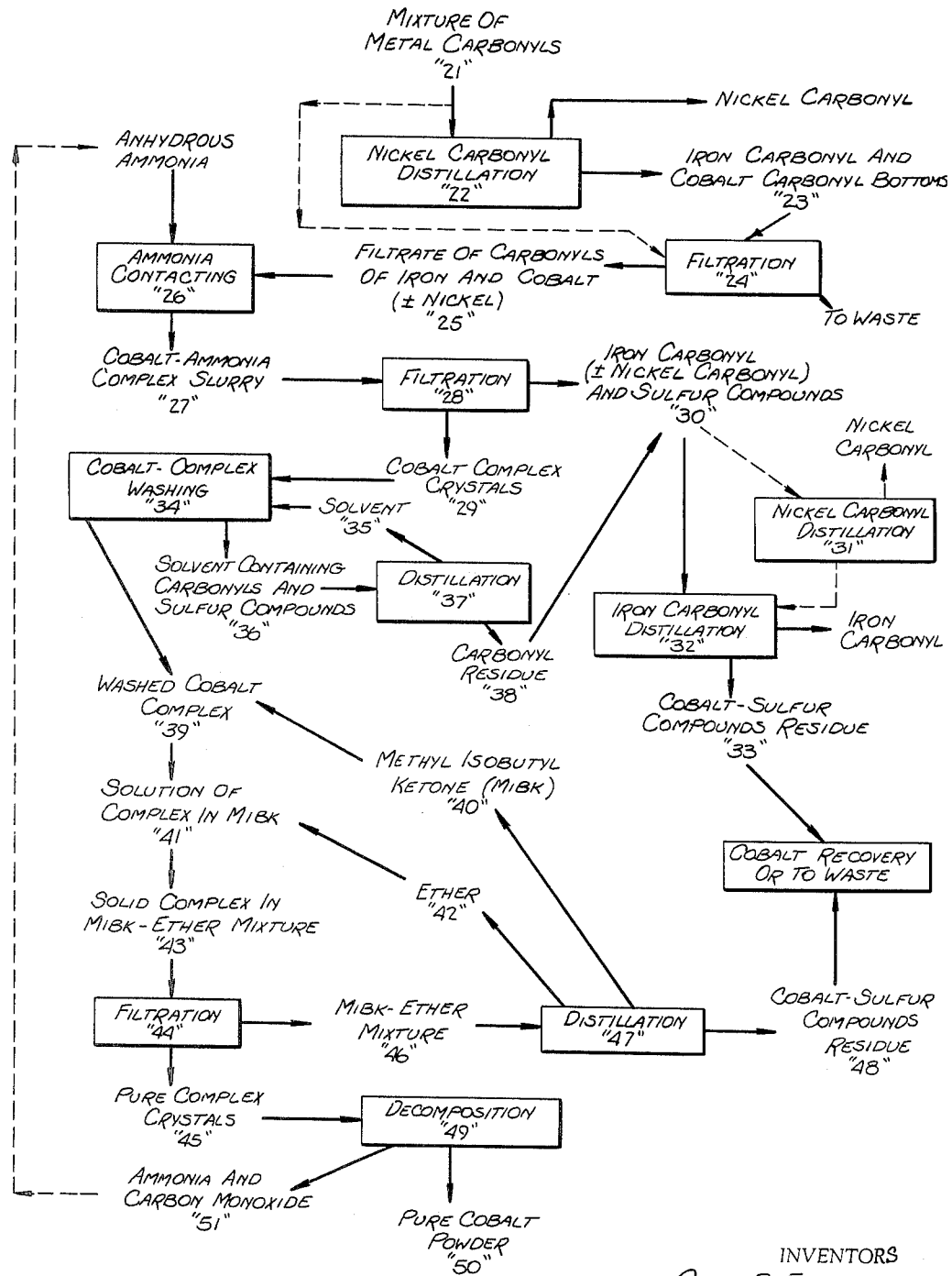

Other objects and advantages will become apparent from the following description taken in conjunction with the accompanying drawing in which:

FIGURE 1 depicts in a block flow diagram a series of operations comprising an illustrative embodiment of the present novel process by which cobalt carbonyl is removed from a mixture of cobalt and iron carbonyls in a product substantially free from iron and readily treated for recovery of cobalt metal therefrom; and FIGURE 2 shows in another block flow diagram a different series of operations comprising another illustrative embodiment of the present novel process by which cobalt carbonyl is removed from a mixture of carbonyls of cobalt, iron and nickel contaminated with sulfur compounds while at the same time eliminating the sulfur from the circuit.

Generally speaking, the present invention contemplates treating a liquid solution of cobalt carbonyl in iron carbonyl and/or nickel carbonyl with a cobalt carbonyl complexing agent to form a solid cobalt carbonyl complex salt which is insoluble in the carbonyl remaining. Various bases and other compounds may be utilized to form the solid cobalt complex. In using anhydrous ammonia as the base, the reaction

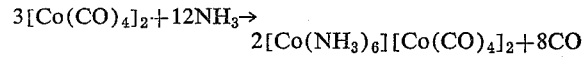

occurs to form the complex, cobalt (II) hexammine di cobalt carbonylate. Other bases which may be utilized are mono methyl amine and mono ethyl amine. Similar reactions occur in using these bases to form the solid cobalt carbonyl complexes cobalt (II) hexamonomethylamine di cobalt carbonylate and cobalt (II) hexamonoethylamine di cobalt carbonylate, respectively, as follows:

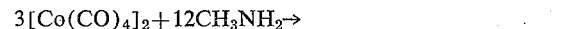
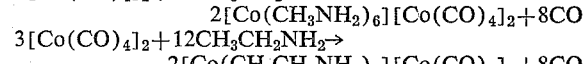

Similar solid cobalt complexes, insoluble in iron carbonyl, may be formed using certain ammonia type compounds and other complexing agents. Thus, for example, acetonitrile may be used for treating the cobalt carbonyl-iron carbonyl mixture. In using acetonitrile the cobalt complex $[Co(CH_3CN)_6][Co(CO)_4]_2$, hexa acetonitrio cobalt (II)-di cobalt carbonylate, is formed.

Other compounds which can be utilized for forming cobalt carbonyl complexes insoluble in iron carbonyl are formamide, acetamide, diacetyldianil and amines such as diethyl amine, dimethyl amine, ethylene imine, and mono-, di- and tri-ethanolamine.

Cobalt is removed from the mixture as the insoluble complex cobalt carbonyl salt which is then washed with a solvent in which the complex salt is insoluble to remove quantities of the mother liquor which have adsorbed thereon. Petroleum ether, which is a mixture of aliphatic hydrocarbons with a boiling range of 90° F. to 140° F., diethyl ether and isopropyl ether are satisfactory solvents. The solvent used for washing the complex is recovered for re-use by removing the carbonyls contained therein. This can be accomplished easily by distillation.

The washed cobalt complex salt is then treated for recovery of the cobalt contained therein by first removing residual wash solvent by mild heating and then by decomposing the salt at a higher temperature to form cobalt metal powder. Decomposition of these cobalt complex salts which are formed by treating the carbonyl mixture with the aforementioned complexing agents is found to proceed easily at low temperatures of in the order of 220° F. to 350° F.

Referring to FIGURE 1 of the drawing which sets forth a block flow diagram of an illustrative embodiment of the hereindescribed novel process involving the use of anhydrous ammonia as a cobalt carbonyl complexing agent and which gives one a better understanding of the present invention, a liquid solution of cobalt carbonyl in iron carbonyl 1 is a first treated in an iron carbonyl distillation operation 2 to remove part of the iron carbonyl therefrom as a vapor. The cobalt bottoms 3 from this distillation operation containing cobalt carbonyl and the remaining iron carbonyl are subjected to a sludge filtration step 4 in which a sludge 5, containing essentially metallic iron, iron oxide, various insoluble lower iron carbonyls, sulfur compounds, if sulfur is present in the feed mixture, and small amounts of cobalt, in the form of cobalt metal and/or cobalt oxide, is removed to waste. The iron carbonyl-cobalt carbonyl filtrate 6 from filtration step 4 is then treated with anhydrous ammonia in ammonia contacting step 7. In this contacting step the solid cobalt carbonyl-ammonia complex referred to hereinbefore which is insoluble in the liquid iron carbonyl remaining is formed. If excess ammonia is used in operation 7 to decrease reaction time, the unreacted ammonia and carbon monoxide gases 9 are preferably recycled for complete utilization of the ammonia. It is to be noted that gases 9 can be easily treated to recover substantially pure ammonia by condensing the ammonia from the ammonia-carbon monoxide mixture and discarding the carbon monoxide. The ammonia can then be used again in the cobalt carbonyl complexing reaction. Alternatively, gases 9 are very useful as a carrier gas in decomposing the iron carbonyl to iron powder.

The slurry 8 of cobalt-ammonia complex and residual liquid carbonyls is then passed through the cobalt complex filtration step 10 in which the solid cobalt complex is removed from the liquid carbonyl solution. In order to shorten contact time the bulk of the cobalt can be removed as cobalt complex in a short reaction time and the liquid iron carbonyl and unreacted cobalt carbonyl remaining is then recycled in operation 12 to the iron carbonyl distillation step 2. If in the ammonia complexing step 7 substantially all of the cobalt carbonyl is reacted with ammonia, the iron carbonyl filtrate can alternatively be removed in filtration operation 10 without recycling to the iron carbonyl distillation step 2 as shown on the flow diagram in FIGURE 1 and may be treated for recovery of the iron therefrom, advantageously by distilling off the iron as pure iron carbonyl and removing impurities, such as sulfur compounds, from the circuit as an insoluble solid residue.

The solid cobalt complex crystals 11 from filtration step 10 are then treated in cobalt complex washing operation 13 to remove liquid iron carbonyl and unreacted liquid cobalt carbonyl which has adsorbed on the solid complex crystals. This washing operation is accomplished with solvent 14 in which the cobalt complex crystals are insoluble. Advantageously, petroleum ether, diethyl ether or isopropyl ether can be utilized as the solvent 14. The solvent is preferably recovered for re-use and this is accomplished by treating the iron-containing solvent 19 from the washing step 13 in a solvent distillation operation 20. As shown in this flow diagram, any loss of solvent is made up by feeding fresh material to the solvent stream 14. Residues from the solvent distillation step 20 are removed to waste or are possibly treated for recovery of the iron carbonyl and any residual cobalt carbonyl therefrom.

The cobalt complex crystals are most advantageously purified by a dissolution and reprecipitation procedure described in greater detail hereinafter. Thus, after being washed with a solvent in which the complex is insoluble, the crystals are dissolved in another solvent such as methyl isobutyl ketone and then reprecipitated in a highly purified state by adding a solvent to the solution to form a solvent mixture in which the complex is substantially insoluble.

The washed cobalt complex crystals 15 containing substantially no iron carbonyl or cobalt carbonyl adsorbed thereon are then treated to recover the cobalt therefrom in cobalt complex decomposition operation 16. In this operation any solvent adsorbed on the complex crystals is first removed by mild heating and the temperature is then raised advantageously to the order of about 300° F. and a slow stream of a carrier gas is passed over the crystals. The crystals are decomposed in this operation into a cobalt powder product 17 and ammonia and carbon monoxide gases 18 which may advantageously be recycled to the ammonia contacting step 7. As aforementioned, carbon monoxide may be removed by condensing out the ammonia.

In carrying the invention into practice iron carbonyl and/or nickel carbonyl may be removed by distillation from the mixture of carbonyls being treated. Care should be exercised to avoid the formation of crystals of cobalt tricarbonyl, especially if the carbonyl mixture is to be filtered before complexing treatment, since smaller amounts of the tricarbonyl as compared with the cobalt tetracarbonyl will remain in solution in the liquid carbonyl and any crystals of the tricarbonyl would be lost in the filtering operation.

It is found that the iron distillation step should be conducted at a temperature of between about 30° F. and about 130° F. Distilling at above 130° F. may result in decomposition of cobalt carbonyl. Optimum temperature for distillation depends, of course, on the composition of the carbonyl mixture. The optimum temperature for any mixture is easily determined by close observation of the distillate gases.

Filtration of the iron distillation bottoms is advisable to remove any insoluble matter in the carbonyl mixture. Otherwise this solid matter would remain to contaminate the solid cobalt complex formed during the contacting of the carbonyl mixture with a base such as ammonia or with another complexing agent as described hereinbefore. The insoluble matter consists primarily of metallic iron and iron compounds such as iron oxide, insoluble lower iron carbonyls and possibly some insoluble sulfur compounds, if sulfur was present in the feed mixture. Analyses of material removed in one filtration operation showed an iron to cobalt ratio in the material of about 40:1. The cobalt was probably present as small amounts of metal, oxide or sulfide or in carbonyl adsorbed on the solid particles.

To illustrate the importance of removing insolubles before the cobalt complexing stage, a batch of cobalt-ammonia complex crystals was formed by treating an iron carbonyl-cobalt carbonyl mixture with anhydrous ammonia. The carbonyl mixture had been subjected to iron distillation but was not filtered before treatment with ammonia. There was a residual amount of 9.4% iron obtained in the cobalt complex crystals which could not be reduced by washing the crystals with a solvent.

After filtration the carbonyl mixture is reacted with one of the complexing agents described hereinbefore to form a solid cobalt carbonyl complex salt which is insoluble in the liquid iron carbonyl remaining. The cobalt complexing operation is conducted at below that temperture at which any carbonyl in the mixture would decompose. In order to describe the present process in more detail, we shall refer to the use of anhydrous ammonia as the cobalt complexing agent. It is to be understood, however, that any of the agents described hereinbefore may be utilized to form a cobalt carbonyl complex which is insoluble in the iron carbonyl remaining.

In utilizing anhydrous ammonia to form cobalt (II) hexammine di cobalt carbonylate,

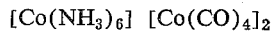

any concentration of ammonia may be utilized. The contacting gas stream may also contain carbon monoxide, a product of the complexing reaction. Water is excluded from the ammonia stream since it dissolves the cobalt-ammonia complex crystals and makes the physical separation of the complex from the iron carbonyl impossible. The reaction temperature is not too critical as long as it remains below the temperature at which any carbonyl in the mixture would decompose. No noticeable change in reaction rate is observed at between room temperature and 130° F. The most convenient reaction temperature, in cases where iron carbonyl and/or nickel carbonyl are being distilled off before the complexing reaction with ammonia, is that of the liquid carbonyl obtained from the still bottoms since no heatng or cooling is required. Reaction proceeds readily, however, at temperatures of as low as the order of −60° F. in liquid ammonia.

At first exposure to the carbonyl mixture, all of the ammonia gas is either dissolved in or reacted with the liquid carbonyl. At sufficiently slow rates of flow the ammonia continues to be completely reacted with the cobalt carbonyl, liberating carbon monoxide which is found in the off-gas. If a rate is used where excess ammonia is introduced the unreacted ammonia in the ammonia-carbon monoxide off-gas mixture can be recycled for complete utilization. This is set up as a counter-current system for best ammonia utilization. In a typical test run the off-gas from the first contact of carbonyl mixture with undiluted anhydrous ammonia gas was 60% NH₃ and 40% CO. This corresponds to a 50% ammonia utilization in one pass. Ammonia utilization would, of course, be much more efficient in a conter-current system.

The dilution of recycled ammonia with carbon monoxide from the carbonyl complexing does not affect its usefulness since the carbon monoxide does not significantly reverse the reaction at normal pressures. In using a counter-current technique, the carbon monoxide-rich gas stream which is produced can be bled off for use as a carrier gas for the iron carbonyl evolving from the iron carbonyl distillation stage.

Where sulfur is present in soluble carbonyl complex compounds in the carbonyl mixture, which is very often the case where the carbonyls have been formed in the presence of sulfur or sulfur compounds, it is possible to complex all the cobalt present only by very prolonged contact time. In such a case it is most advantageous to complex substantially all the cobalt carbonyl in the carbonyl mixture while leaving any complex cobalt carbonyl sulfides dissolved in the liquid carbonyl remaining. The residual liquid can then be distilled to remove iron carbonyl and/or nickel carbonyl to leave the sulfur compounds in a residue which can be discarded or treated for recovery of metal values.

The following table shows the progressive removal of cobalt by formation of complex from a mixture of cobalt carbonyl and iron carbonyl containing 12.5% cobalt as carbonyl. A minor portion of the cobalt was present in this mixture as complex cobalt carbonyl sulfide compounds. As can be seen from the test results in this table, a major portion of the cobalt was removed as complex in less than half an hour. The final traces of cobalt were removed, however, only by prolonged contact time.

| Treatment time: | Percent cobalt as carbonyl in carbonyl mixture |
|---|---|
| Initial mixture | 12.5 |
| 25 minutes | 5 |
| 12 hours | 0.2 |
| 15 hours | 0.09 |
| 20 hours | 0.01 |

FIGURE 2 of the drawing sets forth a block flow diagram of another illustrative embodiment of the herein-described novel process, in which embodiment a mixture of carbonyls of nickel, iron and cobalt which contains sulfur contamination is treated for removal of sulfur compounds and recovery of pure cobalt as well as pure nickel carbonyl and pure iron carbonyl. In this embodiment anhydrous ammonia is used as the cobalt carbonyl complexing agent but any of the other complexing agents described hereinbefore could, of course, be utilized.

Referring to FIGURE 2 of the drawing, a mixture of liquid metal carbonyls 21 containing nickel, cobalt and iron carbonyls and contaminated with sulfur compounds is subjected to distillation operation 22 in which substantially all the nickel carbonyl is distilled from the mixture of metal carbonyls leaving a bottoms residue of liqud iron carbonyl and cobalt carbonyl 23. The iron carbonyl and cobalt carbonyl bottoms are then filtered in operation 24 to remove any solid material which goes to waste as shown on this flow diagram. Alternately, the metal carbonyl mixture 21 can be filtered directly in operation 24 as shown on the flow diagram in FIGURE 2 with distillation of nickel carbonyl from the mixture being accomplished later in the operations. The filtrate of the mixture of carbonyls of iron and cobalt and nickel, if present, 25 is then treated with anhydrous ammonia in ammonia contacting step 26. In this contacting step cobalt carbonyl present in the mixture is converted to the solid cobalt carbonyl-ammonia complex referred to hereinbefore which is insoluble in the liquid carbonyls remaining. Thus, a slurry of cobalt carbonyl-ammonia complex in liquid carbonyl 27 is formed.

Slurry 27 is passed through filtration operation 28 to remove the cobalt complex crystals 29 and leave a filtrate of iron carbonyl, nickel carbonyl, if present, and complex sulfur compounds 30. This filtrate, if it contains nickel carbonyl, is subjected to distillation in operation 31 to drive off pure nickel carbonyl as shown in this flow diagram. The distillation residue containing iron carbonyl and sulfur compounds dissolved therein is then subjected to distillation in operation 32 in which pure iron carbonyl is driven off. If no nickel carbonyl is present in filtrate 30 the filtrate proceeds directly to distillation 32 as shown in this flow diagram. The residue 33 remaining from distillation operation 32 consists primarily of solid cobalt carbonyl sulfide complex compounds. This residue can be treated for recovery of the cobalt therefrom or discarded to waste.

The cobalt complex crystals 29 obtained from filtration operation 28 are first subjected to a washing step 34 with a solvent 35, such as petroleum ether, diethyl ether, isopropl ether, or higher ethers, in which the crystals are insoluble. The washed cobalt complex crystals 39 are removed from washing step 34 and the solvent 36 remaining, which contains residual carbonyls and complex sulfur compounds, is passed to solvent distillation operation 37 in which solvent is removed from the residual carbonyls and complex sulfur compounds and is returned to the cobalt complex washing step 34 as shown in this flow diagram. The carbonyl residue 38, containing complex sulfur compounds, from distillation step 37 goes to waste or is advantageously combined with the filtrate 30 from filtration operation 28 and is treated for removal of metal carbonyls therefrom.

The washed cobalt complex crystals 39 are treated with a solvent 40 in which the crystals are soluble. This solvent can be methyl isobutyl ketone (MIBK) as shown in this flow diagram or other solvent, as disclosed hereinafter. The solution of cobalt complex in MIBK 41 is then treated with a solvent in which the complex crystals are insoluble. An ether 42, such as petroleum ether, diethyl ether or isopropyl ether is advantageously used as the solvent in this operation. Sufficient ether is added to solution 41 to precipitate substantially all the cobalt complex crysals and form a slurry 43 of solid complex in a mixture of MIBK and ether. This slurry 43 then passes to filtration operation 44 in which the pure complex crystals 45 are removed from the slurry, leaving a mixture of MIBK and ether 46. It is to be noted that the cobalt complex crystals 29 from filtration operation 28 may bypass washing step 34, particularly in cases where sulfur contamination is low, and be treated directly with MIBK and ether to purify the crystals.

To avoid losses of cobalt due to decomposition of cobalt complex in reacting with water it is important that organic solvents which are used for washing and purifying the complex be free of water. Thus, in using MIBK, which may contain small amounts of water, in purifying operations it has been found to be beneficial to saturate the MIBK with ammonia gas, which reacts with any water present, before contacting the cobalt complex crystals.

The mixture 46 is treated for recovery of MIBK and ether therefrom in distillation operation 47 by which the MIBK and ether can be driven off in separate fractions 40 and 42 as shown in this flow diagram and returned to washed complex 39 and 41, respectively. The residue 48 from distillation operation 47 consists primarily of cobalt-containing sulfur compounds and this residue can be treated for recovery of cobalt therefrom or discarded to waste.

The washed and purified cobalt complex crystals 45 are treated to recover the cobalt therefrom in cobalt complex decomposition operation 49. It is best to remove any solvent remaining on the crystals before decomposing them. MIBK can be removed by washing with a very volatile ether. The ether and any remaining solvent is then removed by mild heating. The temperature is then raised to the order of about 300° F. and a slow stream of carrier gas, e.g., carbon monoxide, is passed over the crystals. By this operation the crystals are decomposed into a pure cobalt powder product 50 and a mixture of ammonia and carbon monoxide gases 51 which are vented or which are advantageously returned to ammonia contacting step 26 as shown in this flow diagram.

The rose-colored cobalt complex crystals are flocculent and adsorb quantities of the liquid carbonyl mother liquor. To remove the iron carbonyl and the unreacted cobalt carbonyl in the adsorbed mother liquor, the filtercake can be treated with a wash solvent in which the complex crystals are insoluble, and refiltered. As set forth hereinbefore, petroleum ether, diethyl ether, isopropyl ether and higher ethers are found to be suitable wash solvents.

Although petroleum ether with a boiling range of between 90° F. and 140° F. diethyl ether and isopropyl ether appear to be the most advantageous solvents for cobalt complex washing because of their low cost, other solvents may be utilized, of course, in which the complex crystals are insoluble. The selection of a solvent is important since the cobalt-ammonia complex crystals are soluble in some of the common solvents. Thus, the complex crystals are soluble in water, acetone, methyl isobutyl ketone, ethylacetate, and tetrahydrofuran. Dibutyl ether, benzene, cyclohexane, carbon tetrachloride, and carbon disulfide are other solvents in which the cobalt complex is insoluble and which may also be utilized in washing the crystals but each of these solvents is more costly than petroleum ether, diethyl ether or isopropyl ether.

In a successful commercial operation the wash solvent must be recovered for re-use. In a typical test run petroleum ether washings were found to contain about 15 grams of iron and 1.5 grams of cobalt per liter, both substantially all present as carbonyls. This iron and cobalt must be removed from the solvent and the removal is most conveniently and economically accomplished by distillation. The low boiling point petroleum ether is very easily removed in this way from the higher boiling point carbonyls.

An advantageous procedure for purifying the complex cobalt carbonyl salt, described in conjunction with the flow diagram in FIGURE 2, involves first washing the complex relatively free of residual amounts of liquid carbonyls using ether or other solvent in which the complex is insoluble. The washed complex crystals are then completely dissolved in an anhydrous solvent in which the crystals are soluble such as methyl isobutyl ketone (MIBK), tetrahydrofuran, ethyl acetate or liquid ammonia. It is important that the solvent selected will not exchange with the ammonia in the cobalt-ammonia complex. MIBK is found to be the most effective solvent for the complex. Diethyl ether, petroleum ether, isopropyl ether or other solvent in which the cobalt complex is insoluble is then added to the solution of cobalt carbonyl complex to reform the complex as an insoluble precipitate. During this procedure of dissolution and reprecipitation a large proportion of the contaminating impurities dissolve and then remain dissolved in the solvent. If necessary the procedure can be repeated one or more times to achieve desired purity. As previously noted in conjunction with the flow diagram in FIGURE 2, the initial washing step may be eliminated and purification of the complex crystals attained by the aforedescribed dissolution and reprecipitation procedure.

In a specific test 22 parts by weight of cobalt-ammonia complex which had been washed with petroleum ether were dissolved in 100 parts by weight of MIBK. Upon adding a volume of petroleum ether equal to that of the MIBK used the cobalt complex was precipitated in a highly purified state.

In another test 100 parts by weight of cobalt-ammonia complex was washed once with diethyl ether to partially remove residual carbonyls and carbonyl sulfide compounds. The complex crystals, still containing some sulfur contamination, were dissolved in 370 parts by weight of MIBK and to this solution was added 980 parts by weight of diethyl ether. The cobalt complex was reprecipitated and removed from the solvent mixture in a highly purified state with substantially all the sulfur contamination remaining dissolved in the solvent mixture.

Cobalt is recovered from the cobalt-ammonia complex crystals by decomposition directly to metal. The crystals are contaminated somewhat by the solvent from the washing stage but this is readily removed by mild heating. The complex crystals are then heated advantageously to a temperature of in the order of about 300° F. and a slow stream of carrier gas such as carbon monoxide, nitrogen, argon or ammonia, is passed over them. The complex crystals decompose to form cobalt metal. Because of its pyrophoric nature the cobalt powder formed should then be cooled in an inert gas to prevent rapid oxidation thereof. It is to be noted that the cobalt complex crystals are also of a very pyrophoric nature and, accordingly, similar precautions should be adopted in their handling. Decomposition of the complex crystals to cobalt metal, ammonia and carbon monoxide proceeds quite rapidly. The ammonia and carbon monoxide gases can, of course, be recycled for re-use in the process. Carbon monoxide may be eliminated from the circuit by condensing ammonia from the gas mixture. Although decomposition appears most advantageous at about 300° F., decomposition is found to commence at about 200° F. and can be carried out at up to 2000° F. Cobalt metal powder with a purity of over 99.9% has been attained by the hereindescribed process from a mixture of cobalt and iron carbonyls.

For the purpose of giving those skilled in the art a better understanding of the invention, an example of the novel combination of operations directed to the obtaining of pure cobalt metal from a mixture of iron and cobalt carbonyls and illustrated by the flow sheet in FIGURE 1 of the accompanying drawing is given hereinafter:

A mixture of cobalt and iron carbonyls 1 with an iron to cobalt ratio of 50:1 is fed in the liquid state at the rate of 20 pounds of cobalt per hour to an iron carbonyl still 2 operating at 110–120° F. Recycled material from subsequent complexing and filtering stages is also fed to the iron still at the rate of 8 pounds of cobalt per hour. This recycled material contains iron and cobalt carbonyls with an iron to cobalt ratio of 44:1. The cobalt bottoms 3 containing iron and cobalt carbonyls with an iron to cobalt ratio of 13:1 are removed from the iron still at a rate of 28 pounds of cobalt per hour. The cobalt bottoms are filtrated in sludge filtration step 4 and an iron sludge 5 is removed to waste at a rate of 10 pounds of iron per hour.

The iron carbonyl-cobalt carbonyl filtrate 6 removed from the sludge filtration step at the rate of 28 pounds of cobalt and 350 pounds of iron per hour is passed countercurrently through a multi-stage ammonia contacting step 7 to produce solid cobalt-ammonia-carbonyl complex crystals which are insoluble in the liquid carbonyls remaining. Anhydrous ammonia is fed to the ammonia contactor at the rate of 12.7 pounds per hour. Ammonia and carbon monoxide gases 9 are removed from the ammonia contacting at the rate of 43 pounds of carbon monoxide and 1.2 pounds of ammonia per hour. A slurry 8 consisting of cobalt-ammonia complex and residual iron and cobalt carbonyls are removed from the ammonia contactor at the rate of about 1300 pounds per hour.

In filtration step 10 the cobalt-ammonia complex crystals are removed from the residual iron and cobalt carbonyls and this residual liquid carbonyl solution is recycled in step 12 to the iron still at the rate of 8 pounds of cobalt, 350 pounds of iron and 890 pounds of carbon monoxide per hour. The cobalt-ammonia complex 11 is removed from filtration step 10 at the rate of 57 pounds per hour. The complex contains some residual carbonyl liquor adsorbed thereon. This residual carbonyl liquor is removed in a countercurrent contactor in cobalt-complex washing stage 13 using petroleum ether. Petroleum ether is run through the contactor at the rate of 182 pounds per hour. The iron-containing petroleum ether stream 19 from contacting stage 13 is subjected to distillation in step 20 and the clean petroleum ether is recycled in stream 14 to the cobalt complex washing contactor. Iron is removed as waste from the bottom of the petroleum ether still. Approximately one pound per hour of petroleum ether is lost in the still bottoms.

Washed cobalt complex 15 from the washing contactor 13 is first mildly heated to drive off any petroleum ether adsorbed thereon and is then treated in decomposition step 16 by being heated to 300° F. in a slow stream of carbon monoxide gas. Carbon monoxide and ammonia is vented from the decomposition vessel at the rate of 25 and 11.5 pounds per hour, respectively. Cobalt metal powder with a purity of over 99.9% is obtained from the cobalt complex decomposer at the rate of 20 pounds per hour.

Although the preceding example illustrates the use of ammonia in separating cobalt carbonyl from iron carbonyl by forming a cobalt-ammonia complex which is insoluble in the liquid carbonyl remaining, the other compounds, including ammonia-type compounds, outlined hereinbefore may be utilized for forming a solid cobalt carbonyl complex.

Thus, monomethyl amine can be utilized for treating the mixture of liquid carbonyls to form $$[Co(CH_3NH_2)_6][Co(CO)_4]_2$$

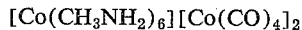

as mentioned hereinbefore. This solid crystalline salt is similar to the cobalt-ammonia-carbonyl complex and upon separation from the residual carbonyls is decomposed in a similar manner at between about 200° F. and 300° F. to form cobalt metal powder. Acetonitrile also can be utilized in treating the liquid carbonyls at between —5° F. and 15° F. to form $$[Co(CH_3CN)_6][Co(CO)_4]_2$$

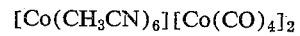

also mentioned hereinbefore. This solid complex is also similar to the cobalt-ammonia-carbonyl complex and upon separation from the residual carbonyls is also decomposed in a similar manner at between about 200° F. and 300° F. to form cobalt metal powder.

With each of these complexes, a similar separation treatment is used as with the ammonia complex with the complex being carefully washed free of iron carbonyl with a suitable solvent such as petroleum ether.

It is to be observed that the present novel process is readily utilized for treating not only mixtures of iron and/or nickel carbonyls with cobalt carbonyl in which the cobalt carbonyl is completely dissolved in liquid iron and/or nickel carbonyls but also mixtures of cobalt carbonyl with iron and/or nickel carbonyls dissolved in an organic solvent such as diethyl ether. Such an organic solution of carbonyls is usually obtained from an operation in which the ordinarily solid cobalt carbonyl is recovered in large enough amounts so that it does not dissolve completely in the iron and/or nickel carbonyls present. By using an organic solvent in the recovery operations, all carbonyls formed are drawn off in a liquid. Thus, the organic solution of carbonyls is treated with one of the cobalt carbonyl complexing reagents described hereinbefore to form solid cobalt complex crystals, insoluble in the particular solvent used, which are removed from the solution leaving the nickel and/or iron carbonyls and any sulfur impurities still dissolved. The residual solution is then treated to recover the organic solvent which can be recycled and the residual carbonyl liquid is treated for recovery of pure nickel carbonyl and/or iron carbonyl, advantageously by distillation, leaving any sulfur impurities behind in a solid residue.

To illustrate the treatment of a mixture of metal carbonyls dissolved in an organic solvent for separation of the carbonyls according to the invention, 100 parts by weight of a mixture of cobalt and iron carbonyls were dissolved in 142 parts by weight of diethyl ether and the resulting solution was reacted with ammonia gas for one hour. A white rose precipitate of the cobalt-ammonia carbonyl complex $[Co(NH_3)_6][Co(CO)_4]_2$ was formed and was removed by filtration. After washing with an additional portion of diethyl ether the cobalt complex crystals were obtained substantially free of iron carbonyl.

Although diethyl ether is an advantageous solvent for a metal carbonyl mixture, other solvents in which the carbonyls are soluble and the cobalt complex crystals insoluble may be utilized, such as petroleum ether, isopropyl ether, benzene, toluene, xylene, carbon tetrachloride, chloroform, hexane, heptane and cyclohexane.

Separation of metal carbonyls according to the invention may be carried out on a mixture of metal carbonyls dissolved in a solvent in which the cobalt complex crystals are soluble. Thus, the solution of metal carbonyls in such a solvent is reacted with ammonia to form the cobalt-ammonia complex which is held in solution. A second solvent such as one of the solvents described hereinbefore in which the cobalt complex crystals are insoluble is then added to the solution to create a mixed solvent in which the complex has only very limited solubility. The complex crystals are precipitated and may be then removed from the solution of metal carbonyls.

To illustrate this technique 50 parts by volume of a mixture of iron carbonyls and cobalt carbonyls were dissolved in 100 parts by volume of MIBK. The resulting solution was reacted with anhydrous ammonia gas and a slight warming of the solution due to the formation of the cobalt-ammonia complex was observed. The reaction product remained dissolved in the MIBK solvent. 300 parts by volume of diethyl ether were then added to the solution and a rose white precipitate of the cobalt-ammonia complex was formed which was filtered off and found to be substantially free of iron.

Although MIBK, in which the cobalt complex is soluble, is an advantageous solvent to be utilized in treating mixtures of metal carbonyls dissolved in a solvent, other solvents in which the complex is soluble such as ethylacetate and tetrahydrofuran can be used. Upon adding solvents in which the cobalt complex is insoluble to these solvents, precipitation of substantially all of the complex can be attained.

It is to be further observed that the present invention provides a novel process for obtaining pure cobalt metal from a mixture of iron and/or nickel and cobalt carbonyls. As set forth hereinbefore, any nickel carbonyl in the mixture follows the iron carbonyl in the treatment and is readily separated therefrom by distillation means. In some instances the mixture may consist primarily of cobalt carbonyl and nickel carbonyl. In such case the separation treatment proceeds along the same lines as those described in conjunction with cobalt carbonyl-iron carbonyl separation since the nickel carbonyl acts in the same way as iron carbonyl in the process. Elimination of any sulfur impurities from a nickel carbonyl-cobalt carbonyl mixture proceeds in the same manner as previously described herein in conjunction with a mixture of carbonyls of nickel, cobalt and iron.

Furthermore, the cobalt carbonyl component of the mixture may contain some cobalt tricarbonyl, and it is to be noted that this cobalt tricarbonyl reacts with ammonia to form the same cobalt-ammonia-carbonyl complex as is formed with the tetracarbonyl according to the reaction.

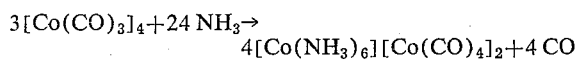

Thus, the presence of amounts of cobalt tricarbonyl in the carbonyl mixture would not produce deleterious results provided, as aforementioned, the tricarbonyl is not present in large enough amounts so as to partially precipitate as crystals which might be lost in any filtering operations preceding treatment for formation of cobalt complex.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A process for removing cobalt from a liquid mixture of carbonyls of cobalt and at least one metal from the group consisting of iron and nickel which comprises treating said liquid mixture of carbonyls with a cobalt carbonyl complexing agent from the group consisting of anhydrous ammonia, monomethyl amine, dimethyl amine, monoethyl amine, diethyl amine, ethylene imine, monoethanolamine, di-ethanolamine, tri-ethanolamine, acetonitrile, formamide, acetamide and diacetyldianil to react with cobalt carbonyl and form a complex cobalt salt, substantially insoluble in nickel and iron carbonyl, and leave unreacted metal carbonyls; and removing said complex cobalt salt, substantially free from iron and nickel, from said unreacted metal carbonyls.

2. A process as described in claim 1 in which the complex cobalt salt removed from the unreacted metal carbonyls is decomposed by heat to form cobalt metal powder.

3. A process as described in claim 1 in which the mixture of carbonyls is treated with monomethyl amine to form a complex cobalt salt of cobalt (II) hexamonomethylamine di cobalt carbonylate.

4. A process as described in claim 3 in which the cobalt (II) hexamonomethylamine di cobalt carbonylate salt removed from the unreacted metal carbonyls is decomposed at above about 200° F. to form cobalt metal powder.

5. A process as described in claim 1 in which the mixture of carbonyls is treated with monoethyl amine to form a complex cobalt salt of cobalt (II) hexamonoethylamine di cobalt carbonylate.

6. A process as described in claim 1 in which the mixture of carbonyls is treated with acetonitrile to form a complex cobalt salt of hexa acetonitrilo cobalt (II)-di cobalt carbonylate.

7. A process as described in claim 6 in which the mixture of carbonyls is treated with acetonitrile at between about −5° F. and about 15° F. and the hexa acetonitrilo cobalt (II)-di cobalt carbonylate salt removed from the unreacted metal carbonyls is decomposed at above about 200° F. to form cobalt metal powder.

8. A process for removing cobalt from a liquid mixture of carbonyls of cobalt and at least one metal from the group consisting of iron and nickel which comprises treating said liquid mixture of carbonyls with anhydrous ammonia to react with cobalt carbonyl and form a complex cobalt salt of cobalt-hexamine-di-cobalt carbonylate, substantially insoluble in nickel and iron carbonyl, and leave unreacted metal carbonyls; and removing said complex cobalt salt, substantially free from iron and nickel, from said unreacted metal carbonyls.

9. A process as described in claim 8 in which the mixture of carbonyls contains both nickel carbonyl and iron carbonyl, said mixture before treatment with ammonia is subjected to distillation to remove nickel carbonyl and iron carbonyl from the mixture and leave a distillate richer in cobalt carbonyl and said distillate is filtered to remove solid material therefrom.

10. A process as described in claim 8 in which the complex cobalt salt removed from unreacted metal carbonyls is treated for removal of residual carbonyls therefrom by dissolving said salt in a first solvent, adding to the solution of cobalt salt in solvent so formed a second solvent, to form a solvent mixture in which said salt is substantially insoluble, to precipitate said salt and leave said residual carbonyls in solution and removing said precipitated cobalt salt from the first and second solvent mixture.

11. A process as described in claim 10 in which the first solvent is methyl isobutyl ketone and the second solvent is an ether from the group consisting of petroleum ether, diethyl ether and isopropyl ether.

12. A process as described in claim 8 in which the mixture of carbonyls is dissolved in a solvent in which the complex cobalt salt is substantially insoluble and the complex cobalt salt formed is removed from the solvent, said solvent containing the unreacted metal carbonyls dissolved therein.

13. A process as described in claim 8 in which the mixture of carbonyls is dissolved in a first solvent in which the complex cobalt salt is soluble, a second solvent is added to said first solvent after formation of the complex cobalt salt to form a solvent mixture in which said complex cobalt salt is substantially insoluble and the complex cobalt salt formed is removed from the solvent mixture, said solvent mixture containing the unreacted metal carbonyls dissolved therein.

14. A process as described in claim 13 in which the first solvent is methyl isobutyl ketone and the second solvent is an ether from the group consisting of petroleum ether, diethyl ether and isopropyl ether.

15. A process for recovering pure cobalt metal from a liquid mixture of cobalt carbonyl and at least one metal carbonyl from the group consisting of iron carbonyl and nickel carbonyl which comprises treating said liquid mixture of carbonyls, at below the decomposition temperature of any of the carbonyls, with anhydrous ammonia to react with cobalt carbonyl and form a solid, complex cobalt salt of cobalt-hexamine-di-cobalt carbonylate, substantially insoluble in nickel and iron carbonyl, and leave unreacted metal carbonyls; removing said solid, complex cobalt salt from said unreacted metal carbonyls; washing said solid, complex cobalt salt with a solvent in which said cobalt salt is substantially insoluble to remove residual carbonyls therefrom; removing solvent from said washed cobalt salt by heating at below the temperature of decomposition of said salt; and heating said so-treated cobalt salt at above about 200° F. to decompose said cobalt salt and form pure cobalt metal powder.

16. A process as described in claim 15 in which the solid, complex cobalt salt is washed with a solvent from the group consisting of petroleum ether, diethyl ether and isopropyl ether.

17. A process as described in claim 15 in which the mixture of carbonyls is treated with anhydrous ammonia at between −60° F. and 130° F., and the washed complex cobalt salt is decomposed at below 2000° F. to form substantially pure cobalt metal powder.

18. A process as described in claim 15 in which the solvent used for washing the solid, complex cobalt salt is treated to remove carbonyls therefrom and the so-treated solvent is returned to the complex cobalt salt washing operation.

19. A process for treating a sulfur-contaminated liquid mixture of carbonyls of cobalt and at least one metal from the group consisting of nickel and iron for removal of sulfur compounds therefrom and recovery of pure cobalt metal which comprises treating said liquid mixture of carbonyls with anhydrous ammonia to react with cobalt carbonyl and form a solid, complex cobalt salt of cobalt-hexamine-di-cobalt carbonylate, substantially insolube in nickel and iron carbonyl, and leave unreacted metal carbonyls containing said sulfur compounds; removing said solid, complex cobalt salt from said unreacted carbonyls; separating said unreacted metal carbonyls from said sulfur compounds by distillation; and heating said solid, complex cobalt salt, substantially free from iron and nickel, to decompose said salt and form pure cobalt metal powder.

20. A process as described in claim 19 in which the solid, complex cobalt salt removed from unreacted metal carbonyls is treated for removal therefrom of residual carbonyls and sulfur compounds admixed therewith by dissolving said salt in a first solvent, adding to the solution of cobalt salt in solvent so formed a second solvent, to form a solvent mixture in which said salt is substantially insoluble, to precipitate said salt and leave said residual carbonyls and sulfur compounds in solution and removing said precipitated cobalt salt from said solvent mixture.

21. A process as described in claim 20 in which the first solvent is methyl isobutyl ketone and the second solvent is an ether from the group consisting of petroleum ether, diethyl ether and isopropyl ether.

22. A process for removing cobalt from a liquid mixture of carbonyls of cobalt and at least one metal from the group consisting of iron and nickel which comprises forming a first solvent mixture of said liquid carbonyls in a first solvent from the group consisting of methyl isobutyl ketone, tetrahydrofuran and ethyl acetate, treating the resulting solution with anhydrous ammonia to react with cobalt carbonyl to form in solution a complex cobalt salt of cobalt hexamine di cobalt carbonylate, treating the thus-formed solution in a second solvent from the group consisting of petroleum ether, diethyl ether and isopropyl ether to form a second solvent mixture in which said complex cobalt salt is substantially insoluble and removing the complex cobalt salt from the solvent mixture, said second solvent mixture containing the unreacted metal carbonyls dissolved therein.

References Cited by the Examiner

UNITED STATES PATENTS

| | | | |
|---|---|---|---|
| 2,004,534 | 6/1935 | Muller | 23—203 |
| 2,757,077 | 7/1956 | Lewis | 23—203 |
| 2,841,617 | 7/1958 | Mertzweiller | 23—203 |
| 2,942,936 | 6/1960 | Coffield | 23—203 |
| 2,944,883 | 7/1960 | Queneau | 75—82 |

OTHER REFERENCES

Blanchard: Chemical Review, vol. 21, No. 1, August 1937, pp. 3–38.

DAVID L. RECK, *Primary Examiner.*

BENJAMIN HENKIN, *Examiner.*

H. C. CUMMINGS, *Assistant Examiner.*